(12) United States Patent
Sakhitab et al.

(10) Patent No.: US 6,718,233 B2
(45) Date of Patent: Apr. 6, 2004

(54) PLACEMENT OF AN OPTICAL COMPONENT ON A SUBSTRATE

(75) Inventors: Farhang Sakhitab, Chestnut Hill, MA (US); Yakov Kogan, Bedford, MA (US); Michael R. Letsch, Charlestown, MA (US); Mark A. Lykam, Bradford, MA (US)

(73) Assignee: Nortel Networks, Ltd., St. Laurent (CA)

( * ) Notice: Subject to any disclaimer, the term of this patent is extended or adjusted under 35 U.S.C. 154(b) by 0 days.

(21) Appl. No.: 10/112,161

(22) Filed: Mar. 29, 2002

(65) Prior Publication Data

US 2003/0187548 A1 Oct. 2, 2003

(51) Int. Cl.[7] .......................... G05B 15/00; G05B 19/00
(52) U.S. Cl. ................... 700/259; 700/112; 700/229; 700/230; 700/244; 700/245; 385/14; 385/52; 385/49; 385/88; 385/92; 385/136; 385/147
(58) Field of Search ................................ 700/259, 245, 700/112, 229, 230, 244; 385/88, 53, 52, 147, 39, 92, 136, 14, 49; 324/750; 414/590; 356/400; 219/121.64, 121.63; 359/819

(56) References Cited

U.S. PATENT DOCUMENTS

| | | | | |
|---|---|---|---|---|
| 6,253,011 B1 | * | 6/2001 | Haake ........................... | 385/52 |
| 6,492,614 B2 | * | 12/2002 | Murdza et al. ......... | 219/121.64 |
| RE38,025 E | * | 3/2003 | Skunes et al. .............. | 356/400 |
| 2002/0003997 A1 | * | 1/2002 | Orinski et al. .............. | 414/590 |
| 2002/0062170 A1 | * | 5/2002 | Skunes et al. ............... | 700/229 |
| 2002/0154870 A1 | * | 10/2002 | Mowry et al. ................ | 385/88 |
| 2002/0168147 A1 | * | 11/2002 | Case et al. ..................... | 385/53 |
| 2002/0181897 A1 | * | 12/2002 | Mowry et al. ................ | 385/88 |

OTHER PUBLICATIONS

Gintic, Cutting edge, 2000, Internet, pp. 1–12.*
Novaoptics, Optical device, 2001, Intenet, pp. 1–2.*
Bonda et al., Development of fixless flip chip bonding to a thin film multichip module stustrate, 1997, IEEE, 875–878.*
Cheng et al., Adaptive synchronization control of a robotic manipulator operating in an intelligent workcell, 1990, IEEE pp. 119126.*

* cited by examiner

Primary Examiner—William A. Cuchlinski, Jr.
Assistant Examiner—McDieunel Marc
(74) Attorney, Agent, or Firm—John C. Gorecki

(57) ABSTRACT

Apparatus for placement of an optical component on a substrate. The apparatus includes a machine vision system for locating the optical component on the substrate, a contact determiner for determining contact therebetween, and a robot for contacting the optical component and the substrate with one another, and for moving the optical component and the substrate relative to one another under guidance from the machine vision system toward a desired position, wherein the optical component and the substrate contact one another for a portion of the movement. A method includes contacting the optical component with the substrate, locating the optical component on the substrate, and moving the optical component and the substrate relative to one another toward a desired position of the optical component on the substrate, wherein the optical component and the substrate contact one another for a portion of the moving.

14 Claims, 1 Drawing Sheet

PLACEMENT OF AN OPTICAL COMPONENT ON A SUBSTRATE

FIELD OF THE INVENTION

This invention relates to optical component placement methods and apparatus in general, and more particularly to precision opto-mechanical assembly of fiberoptic telecommunication components.

BACKGROUND OF THE INVENTION

Development of high productivity methods for manufacturing precision opto-mechanical assemblies is important to ensure large volume production of fiberoptic telecommunication assemblies. Such methods generally avoid active alignment of components using measured device optical performance but rather maintain high mechanical tolerances during assembly so as to achieve the required optical performance. Vision systems are widely used in the precision assembly of mechanical components. In order to achieve high accuracy placement with the assistance of machine vision, an assembly robot needs to have high resolution, a repeatable motion control system and a stiff mechanical structure. The main advantage of utilizing the machine vision system is in reduced requirements for motion control, mechanical structure accuracy, and parts handling accuracy by the assembly robot's arm tool.

SUMMARY OF THE INVENTION

An object of the invention is to provide a method for precision placement of an optical component on a substrate with relaxed requirements pertaining to a robot's motion control system and mechanical structure.

Another object of the invention is to provide an apparatus for precision placement of an optical component on a substrate with relaxed requirements pertaining to a robot's motion control system and mechanical structure.

With the above and other objects in view, as will hereinafter appear, there is provided an apparatus for precision placement of an optical component on a substrate and precision assembly thereof into a fiber optic telecommunication package, the apparatus comprising: a machine vision system for locating the optical component relative to a fiducial point on the substrate; contact determiner means for determining contact of the optical component and the substrate with one another; and a robot being configured for contacting the optical component and the substrate with one another under guidance from the contact determiner means, and the robot being further configured for moving the optical component and the substrate relative to one another under guidance from the machine vision system toward a desired position of the optical component relative to the fiducial point on the substrate; wherein said optical component and the substrate contact one another for at least a portion of the movement of the optical component and the substrate toward the desired position of the optical component relative to the fiducial point on the substrate.

In accordance with a further feature of the invention there is provided a method for precision placement of an optical component on a substrate and precision assembly thereof into a telecommunication package, the method comprising: contacting the optical component and the substrate with one another; locating the optical component relative to a fiducial point on the substrate; and moving the optical component and the substrate relative to one another toward a desired position of the optical component relative to the fiducial point on the substrate; wherein the optical component and the substrate contact one another for at least a portion of the step of moving the optical component and the substrate relative to one another toward the desired position of the optical component relative to the fiducial point on the substrate.

The above and other features of the invention, including various novel details of construction and combinations of parts and method steps will now be more particularly described with reference to the accompanying drawings and pointed out in the claims. It will be understood that the particular devices and method steps embodying the invention are shown by way of illustration only and not as limitations of the invention. The principles and features of this invention may be employed in various and numerous embodiments without departing from the scope of the invention.

BRIEF DESCRIPTION OF THE DRAWINGS

These and other objects and features of the present invention will be more fully disclosed or rendered obvious by the following detailed description of the preferred embodiments of the invention, which are to be considered together with the accompanying drawing wherein.

DETAILED DESCRIPTION OF THE PREFERRED EMBODIMENT

Figure 1:
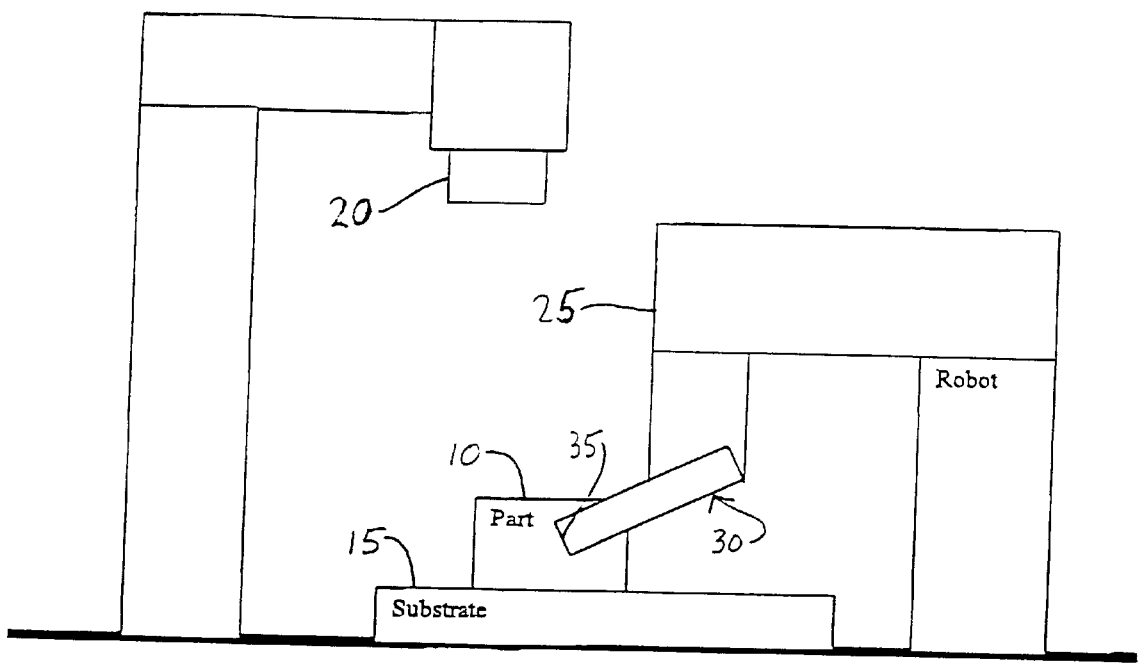
FIG. 1 is a schematic view of one form of an apparatus for precision placement of an optical component on a substrate, illustrative of an embodiment of the invention.

In a preferred embodiment of the present invention, novel methods and apparatus are provided for precision opto-mechanical assembly of fiberoptic telecommunication components. These novel methods and apparatus directly dampen vibrations rather than require the use of expensive robot motion control systems with sophisticated dampening systems. Accordingly, a preferred embodiment of the present invention, which uses direct vibration techniques, allows the use of less precise robot motion control systems. This configuration, in turn, translates into significant cost savings for the manufacturing process.

Referring to FIG. 1, in a preferred embodiment of the present invention, there is shown an apparatus 5 for precision placement of an optical component 10 on a substrate 15. Apparatus 5 comprises a machine vision system 20, a robotic assembly system 25, and a contact determining system (not shown). Robotic assembly system 25 generally comprises a multi-axis motion stage (not shown) and an arm 30. Arm 30 is shown having an end portion 35 configured for selective attachment and movement of optical component 10. In an alternative embodiment of the present invention (not shown), substrate 15 is placed on a stationary surface rather than a multi-axis motion stage.

Still referring to FIG. 1, in a preferred embodiment of the invention, arm 30 of robotic assembly system 25 is configured to determine contact between optical component 10 and substrate 15. A sensor device (not shown) is contained in robotic assembly system 25 to detect contact between optical component 10 and substrate 15 as end portion 35 holding optical component 10 is positioned toward substrate 15. This sensor device can be programmed to detect contact at a single interval during the positioning of arm 30. Alternatively, the sensor device can be programmed to continuously monitor whether optical component 10 and substrate 15 are in contact with one another. The sensor device is configured to provide a feedback signal to robotic assembly system 25. This feedback signal in effect provides guidance to the positioning of end portion 35 so as to maintain contact between optical component 10 and substrate 15 during at least a portion of the positioning as guided by machine vision system 20.

In another preferred embodiment of the present invention (not shown), an auxiliary machine vision system is provided to determine contact between optical component 10 and substrate 15 instead of a sensor device as described above. The auxiliary machine vision system is configured to monitor the position of optical component 10 and substrate 15 relative to one another and to provide a feedback signal to robotic assembly system 25 based on this position. This feedback signal in effect provides guidance to the positioning of end portion 35 so as to maintain contact between optical component 10 and substrate 15 during at least a portion of the positioning as guided by machine vision system 20.

In another preferred embodiment of the present invention (not shown), robotic assembly system 25 is pre-programmed to position optical component 10 and substrate 15 in contact with one another. In this preferred embodiment of the present invention, robotic assembly system 25 does not require either a sensor device or an auxiliary machine vision system as it is pre-programmed to position optical component 10 and substrate 15 in contact with one another. The geometry of optical component 10, substrate 15 and robotic assembly system 25 relative to one another is predetermined and loaded into the robotic assembly system 25 for computation of appropriate positioning of arm 30 so as to place optical component 10 and substrate 15 in contact with one another. Based on this geometry and pre-programmed locations, robotic assembly system 25 is configured to control arm 30 so as to maintain contact between optical component 10 and substrate 15 during at least a portion of the positioning as guided by machine vision system 20.

In alternative preferred embodiments of the present invention (not shown), optical component 10 and substrate 15 may each be positioned relative to one another by adjustable portions of robotic assembly system 25 in connection to each one. Alternatively, substrate 15 may be positioned relative to a positionally fixed optical component 10 by an adjustable portion of robotic assembly system 25 in connection to substrate 15. In any of these configurations, examples of adjustable portions of robotic assembly system 25 include, for illustrative purposes only, an arm or multi-axis motion stage. These examples are not intended to limit the scope of the invention.

Referring again to FIG. 1, in a preferred embodiment of the present invention, machine vision system 20 is shown configured to view the location of optical component 10 and substrate 15 relative to the upper surfaces of one another. The upper surface of substrate 15 is provided with a fiducial point (not shown) for recognition by machine vision system 20. The placement position of optical component 10 on substrate 15 is predetermined relative to the location of the fiducial point (not shown). Machine vision system 20 is configured to locate both the fiducial point (not shown) on substrate 15 and the position of optical component 10 on substrate 15. Next, a signal is generated corresponding to the correction movement necessary to reposition optical component 10 and substrate 15 relative to one another so as to position optical component 10 at the predetermined placement position relative to the fiducial point (not shown). This signal is sent to robot assembly system 25 to move optical component 10 and/or substrate 15 into the pre-determined placement position as described herein.

In a preferred embodiment of the present invention, a method is provided for precision placement and attachment of optical component 10 on substrate 15. First, substrate 15 is positioned on a support in a fixed position to robotic assembly system 25 and optical componenet is positioned on end portion 35 of arm 30 of robotic assembly system 25. Next, arm 30 of robotic assembly system 25 is moved toward substrate 15 until the contact determining system detects contact between optical component 10 and substrate 15. A predetermined force is then applied by robotic assembly system 25 so as to create friction between optical component 10 and substrate 15.

Machine vision system 20 then takes an image of optical component 10 on substrate 15, locates identifying features on substrate 15, and defines a correction signal. The correction signal is sent to robotic assembly system 25 for generating a correction movement so as to re-position optical component 10 at a pre-determined location relative to the identifying features on substrate 15. As optical component 10 is resting on substrate 15 at the time that machine vision system takes the image, external factors such as instability and vibration of machine vision system 20 do not have as great an affect on the position of optical component 10 as these external factors would on an optical component held in the air above a substrate. This configuration results in greater position stability of optical component 10 and allows a more precise machine vision measurement of the relative position of optical component 10 with respect to the locating features on substrate 15.

Robotic assembly system 25 generates and performs a correction movement of optical component 10 and substrate 15 relative to one another based on the correction signal received from machine vision system 20. Optical component 10 and substrate 15 contact one another during the correction movement. In a preferred embodiment of the present invention, optical component 10 slides on substrate 15 during the corrective movement. This contact introduces mechanical dampering into the system and constrains the motion to one plane, thereby achieving more precise motion.

After the correction movement is executed, machine vision system 20 takes another image of optical component 10 relative to substrate 15 and another correcton signal is generated. Robotic assembly system 25 then generates and performs another correction movement of optical component 10 and substrate 15 relative to one another. This process can be repeated several times until the position of optical component 10 conforms to a location within specified tolerances with respect to fiducials located on substrate 15.

Modifications to the Preferred Embodiment

The robotic assembly system 25 may not need the touch sensing capability. It may be sufficient for robotic assembly 25 to go to the programmed position in the proximity of substrate 15 to ensure the contact between optical component 10 and the substrate. Or another vision system can be used to detect the contact between the part and the substrate.

When the corrective motion is performed, it may be necessary to pick up optical component 10 from substrate 15 and put it back to complete the motion.

BENEFITS OF THE INVENTION

The method and apparatus of the present invention allows achievement of higher tolerances than a conventional machine vision guided parts assembly. As the bottom of optical component 10 and fiducials are located in the same plane, the plane of the surface of substrate 15, this configuration allows capture of the sharpest image.

Influences of undesirable motion is greatly reduced due to the introduction of mechanical friction between optical component 10 and substrate 15. For example, these influences may include servoing of robotic assembly system 25 associated with positioning and amplification of external vibration due to mechanical structure with a lack of stiffness. Friction provided by optical component 10 sliding on the substrate surface dampens undesirable motion in a wider frequency range than a servo system. All of the above-identified benefits together result in improved accuracy of the assembly.

In addition, the requirements concerning the mechanical construction of the equipment and the accuracy of the motion control system are relaxed so as to also reduce the cost of the equipment.

What is claimed is:

1. Apparatus for precision placement of an optical component on a substrate and precision assembly thereof into a fiber optic telecommunication package, said apparatus comprising:
   a machine vision system for locating the optical component relative to a fiducial point on the substrate;
   contact determiner means for determining contact of the optical component and the substrate with one another; and
   a robot configured for contacting the optical component and the substrate with one another under guidance from said contact determiner means, said robot being further configured for moving the optical component and the substrate relative to one another under guidance from said machine vision system toward a desired position of the optical component relative to the fiducial point on the substrate;
   wherein the optical component and the substrate contact one another for at least a portion of the movement of the optical component and the substrate toward the desired position of the optical component relative to the fiducial point on the substrate.

2. Apparatus according to claim 1 wherein said machine vision system locates the optical component relative to the fiducial point on the substrate prior to moving the optical component and the substrate relative to one another by said robot.

3. Apparatus according to claim 2 wherein said machine vision system and said robot are configured for performing at least two iterations of locating the optical component relative to the fiducial point on the substrate and moving the optical component and the substrate relative to one another, respectively.

4. Apparatus according to claim 1 wherein said contact determiner means comprise a sensor.

5. Apparatus according to claim 4 wherein said sensor detects pressure between the optical component and the substrate.

6. Apparatus according to claim 1 wherein said contact determiner means comprise an auxiliary machine vision system.

7. Apparatus according to claim 6 wherein said auxiliary machine vision system analyzes a profile view between the optical component and the substrate.

8. Apparatus according to claim 1 wherein said contact determiner means comprise a pre-programmed geometry of the optical component relative to the substrate.

9. Apparatus according to claim 8 wherein said robot further comprises an arm having a first end for selectively moving the optical component, and further wherein the first end of said arm corresponds to said pre-programmed geometry of the optical component relative to the substrate.

10. Apparatus according to claim 1 further comprising attachment means for attaching the optical component and the substrate together with one another at the desired position of the optical component relative to the fiducial point on the substrate.

11. A method for precision placement of an optical component on a substrate and precision assembly thereof into a telecommunication package, said method comprising:
   providing apparatus for precision placement of the optical component on the substrate and precision assembly thereof into a fiber optic telecommunication package, said apparatus comprising:
      a machine vision system for locating the optical component relative to a fiducial point on the substrate;
      contact determiner means for determining contact of the optical component and the substrate with one another; and
      a robot configured for contacting the optical component and the substrate with one another under guidance from said contact determiner means, and said robot being further configured for moving the optical component and the substrate relative to one another under guidance from said machine vision system toward a desired position of the optical component relative to the fiducial point on the substrate;
   wherein the optical component and the substrate contact one another for at least a portion of the movement of the optical component and the substrate toward the desired position of the optical component relative to the fiducial point on the substrate; determiner means;
   determining contact of the optical component and the substrate with one another;
   locating the optical component relative to the fiducial point on the substrate with said robot under guidance from said machine vision system; and
   moving the optical component and the substrate relative to one another with said robot under guidance from said machine vision system toward the desired position of the optical component relative to the fiducial point on the substrate;
   wherein the optical component and the substrate contact one another for at least a portion of the step of moving the optical component and the substrate toward the desired position of the optical component relative to the fiducial point on the substrate.

12. A method according to claim 11 further comprising the step of attaching the optical component and the substrate together at the desired position of the optical component relative to the fiducial point on the substrate.

13. A method for precision placement of an optical component on a substrate and precision assembly thereof into a telecommunication package, said method comprising:
   contacting the optical component and the substrate with one another;
   locating the optical component relative to a fiducial point on the substrate; and
   moving the optical component and the substrate relative to one another toward a desired position of the optical component relative to the fiducial point on the substrate;
   wherein the optical component and the substrate contact one another for at least a portion of the step of moving the optical component and the substrate relative to one another toward the desired position of the optical component relative to the fiducial point on the substrate; and wherein the steps of locating the optical component relative to the fiducial point on the substrate and moving the optical component and the substrate relative to one another toward the desired position of the optical component relative to the fiducial point on the substrate are repeated in at least one repositioning iteration so as to more precisely reposition the optical component and the substrate with each repositioning iteration.

14. A method according to claim 13 further comprising the step of attaching the optical component and the substrate together at the desired position of the optical component relative to the fiducial point on the substrate.

* * * * *